United States Patent [19]

Herbert et al.

[11] Patent Number: 5,680,912

[45] Date of Patent: Oct. 28, 1997

[54] DISC BRAKE

[75] Inventors: Andreas Herbert, Darmstadt; Wlodzimierz Macke, Heddesheim, both of Germany

[73] Assignee: Perrot Bremsen GmbH, Mannheim, Germany

[21] Appl. No.: 678,041

[22] Filed: Jul. 10, 1996

[30] Foreign Application Priority Data

Jul. 10, 1995 [DE] Germany .................. 195 25 048.6

[51] Int. Cl.[6] ............... F16D 65/16; F16D 65/20; F16D 65/52
[52] U.S. Cl. ............... 188/72.9; 188/73.38; 188/196
[58] Field of Search ............... 188/71.7–71.9, 188/72.6, 72.7, 72.8, 72.9, 196 D, 196, 196 P, 73.31, 73.35, 73.36, 73.38; 192/76.23, 70.25, 111 A, 111 B, 111 T; 403/359, 383

[56] References Cited

U.S. PATENT DOCUMENTS

| 4,162,720 | 7/1979 | Haraikawa | 188/72.7 |
|---|---|---|---|
| 4,390,084 | 6/1983 | Haraikawa et al. | 188/72.7 |
| 5,379,867 | 1/1995 | Macke et al. | 188/71.9 |
| 5,400,875 | 3/1995 | Anthony et al. | 188/72.9 |
| 5,449,052 | 9/1995 | Macke et al. | 188/71.9 |
| 5,515,949 | 5/1996 | Baumgartner et al. | 188/72.9 |
| 5,520,267 | 5/1996 | Giering et al. | 188/72.7 |
| 5,547,048 | 8/1996 | Anthony | 188/72.9 |
| 5,582,273 | 12/1996 | Baumgartner | 188/72.9 |

*Primary Examiner*—Robert J. Oberleitner
*Assistant Examiner*—Chris Schwartz
*Attorney, Agent, or Firm*—Jacobson, Price, Holman & Stern, PLLC

[57] ABSTRACT

A disc brake has a driven adjusting mechanism with a thrust shaft. A drive element of the adjusting mechanism is coupled to the thrust shaft in a manner such that the drive element and thrust shaft are mutually irrotational but are axially movable with respect to each other. A coupling is provided between the drive element and thrust shaft so that they can mutually move translationally in each of two directions, which directions are perpendicular to the longitudinal axis of the thrust shaft. In this way, the adjustment of the brake is rendered insensitive to vibrations and oscillations, and to fluctuations due to manufacturing tolerances and assembly deviations. The process of assembly of the brake is also made simpler and easier.

7 Claims, 3 Drawing Sheets

5,680,912

DISC BRAKE

BACKGROUND OF THE INVENTION

This invention relates to a disc brake comprising a brake caliper, with a caliper housing, wherein the two arms of the caliper extend over a brake rotor and engage brake heads with the brake pads which are to be applied against the opposite sides of the brake rotor; and a brake application mechanism disposed on one side of the rotor, having an application shaft oriented essentially parallel to the plane of the rotor, in which the shaft is braced against the caliper at the end of the shaft which is farther from the rotor, and in which the end of the shaft which is closer to the rotor is operatively connected to the brake head disposed on the application side of the rotor, further wherein the application shaft has a cam contour whereby when the shaft is rotated a relative movement of the caliper and the brake head is provided in the axial direction of the rotor namely when an application force is transmitted to a swinging brake lever which extends radially from the application shaft and executes a swinging movement, the brake further including an adjusting mechanism, coupled on one side to the application shaft and on the other, via a drive element, to a thrust shaft, whereby rotation of the thrust shaft leads to a change in the distance between the brake rotor and the application-side brake head, and wherein the drive element is coupled to the thrust shaft in rotationally fixed manner but such that the thrust shaft is axially slidable with respect to the drive element.

A disc brake of this type having a single thrust shaft is disclosed in German OS 43 23 392 A1; corresponding to U.S. application Ser. No. 08/271,467 and a brake having two thrust shafts is disclosed in German OS 43 07 017 A1 corresponding to U.S. Pat. No. 5,379,867. These disclosures are incorporated herein by reference.

With the known disc brakes, fluctuations due to manufacturing tolerances or assembly variations, affecting the drive element and its associated thrust shaft, can have a deleterious effect on the ease and accuracy of the brake adjustment process, particularly since these pieces are mutually slidable and need to transmit torque while at different mutual axial positions. The fluctuations also affect the process of assembling the drive element and thrust shaft together. Further, vibrations or oscillations of the brake caliper, and of the internal brake parts, in combination with variations in positioning during assembly of these parts, can result in incorrect brake adjustment.

SUMMARY OF THE INVENTION

It is an object of the present invention to refine a disc brake of the type described, such that correct brake adjustment is not adversely affected by fluctuations due to manufacturing tolerances and assembly variations, or by vibrations and oscillations; and such that assembly is simplified and facilitated.

According to the invention, a coupling is provided between the thrust shaft and the drive element so that the drive element is translationally movable with respect to the thrust shaft in at least two directions perpendicular to the axis of the thrust shaft.

By means of this translational movability (slidability), relative movement between the drive element and the associated thrust shaft, which movement results from manufacturing tolerances and assembly variations, can be compensated for, and easy and direct brake adjustment can be assured.

The slidability also absorbs vibrations and oscillations in the brake parts, preventing such vibrations and oscillations from being transmitted from the drive element to said thrust shaft, which otherwise could cause incorrect adjustment.

Also, such slidability allows greater tolerances in assembly.

It is preferred according to the invention if the drive element and thrust shaft mutually interpenetrate (e.g., telescopically), with a profile plate provided in a ring-shaped space separating them, the profile plate being coupled to the drive element and to the thrust shaft in a mutually non-rotational manner, but wherein the profile plate is translationally movable with respect to the thrust shaft in a first direction which is perpendicular to the longitudinal axis of the thrust shaft, and is translationally movable with respect to the drive element in a second direction which is also perpendicular to the longitudinal axis of the thrust shaft.

The use of such a profile plate having an outer profile which allows radial sliding with respect to the thrust shaft or the drive element, and having an inner profile which allows radial sliding with respect to the drive element (or the thrust shaft), enables the brake as a whole to be assembled in a particularly simple and easy fashion.

A projection may be provided on the drive element, which engages a recess in the profile plate; and a projection may be provided on the profile plate, which engages a slot in the thrust shaft.

The profile plate may be mounted on the thrust shaft (or the drive element) in an axially fixed position with respect to said thrust shaft or said drive element, respectively. Preferably, the profile plate is held on the thrust shaft at a location remote from the brake rotor, and in a manner such that the profile plate is not slidable in the longitudinal direction of the thrust shaft.

In this connection, the profile plate may (at least partially) cover or overlap a thread of the thrust shaft, for a distance in the direction of the longitudinal axis of the thrust shaft. Such thread may be provided to achieve a change in the distance between the brake rotor and the application-side brake head by rotation of the thrust shaft.

The thrust shaft with thread may be screwed into a thrust piece having a detent region, so that if the thrust shaft is screwed into the thrust piece beyond a certain limiting extent, the profile plate comes to abut against said detent region. The profile plate may also serve as a means of limiting the screw-mediated advance of the thrust shaft.

In principle, the two directions of relative translational mobility of the thrust shaft and drive element, which directions are perpendicular to the longitudinal axis of the thrust shaft, may have any mutual relationship, as long as they do not coincide. It is preferable if such directions are mutually perpendicular as well as being perpendicular to the longitudinal axis of the thrust shaft.

BRIEF DESCRIPTION OF DRAWINGS

The invention will be described in more detail below, with reference to the accompanying drawings.

DESCRIPTION OF PREFERRED EMBODIMENT

Figure 1:
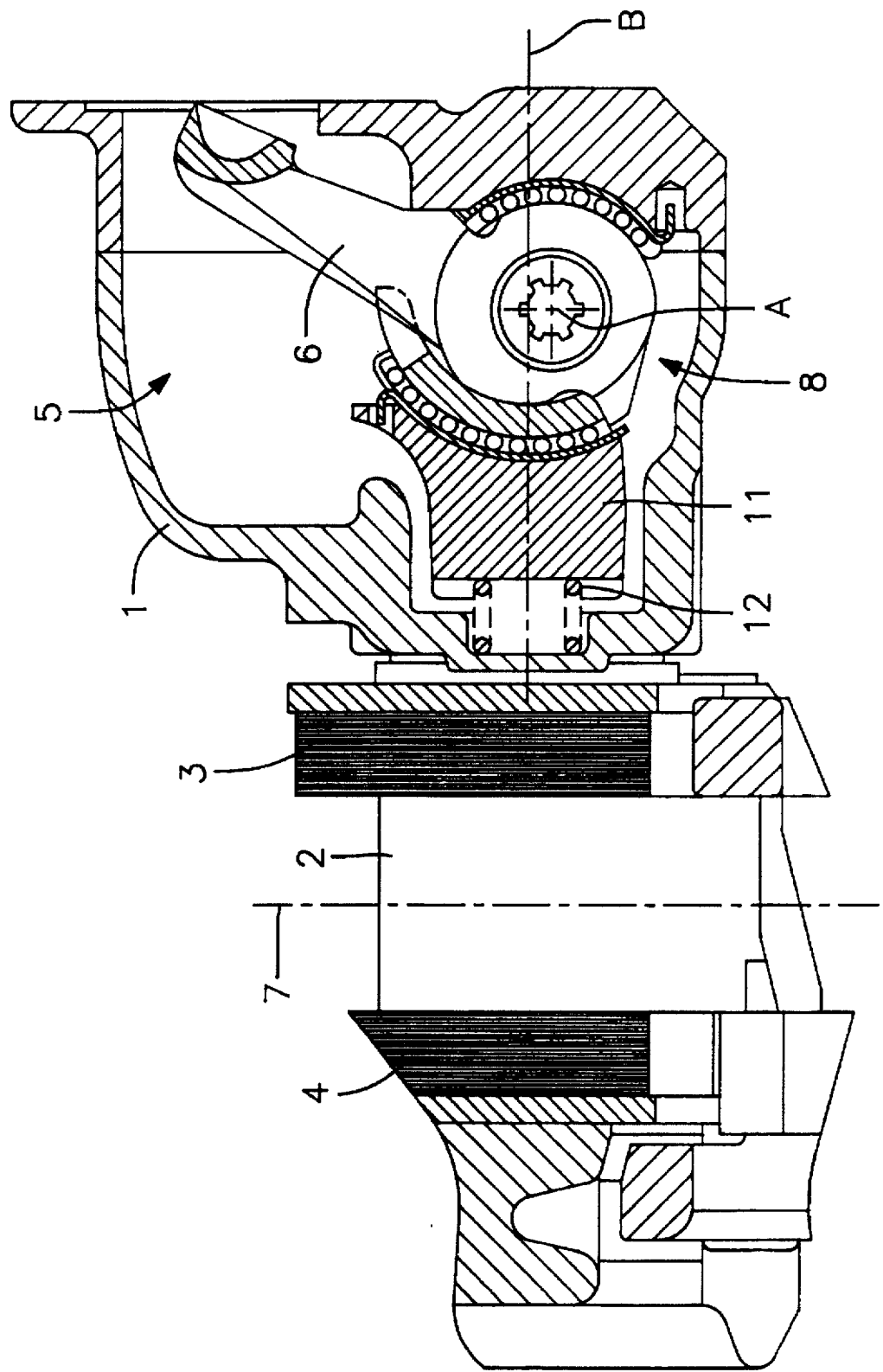
FIG. 1 is a cross sectional view of a disc brake, in a plane extending perpendicularly to the plane of the brake rotor.

The disc brake illustrated in the drawings is a sliding caliper disc brake, having a caliper 1 with two arms which extend over a brake rotor 2 so as to engage the rotor with respective brake heads 3, 4 guided in and supported against either a brake support (not shown) or the caliper 1 itself in known manner. Caliper 1 is mounted so as to be slidable transversely to the rotor 2, by means not shown. An application mechanism 5 is associated with the caliper 1 on the side of the caliper. The application mechanism 5 has a swinging lever 6 the swing axis A of which is essentially parallel to the midplane ("principal plane") 7 of the rotor 2. However, the invention is not limited to this exemplary embodiment. Embodiments of brakes within the scope of the invention may have a swinging lever 6 the swing axis of which changes its position (location and/or orientation) with increasing application force. The brake lever 6 is mounted on and extends radially from an application shaft 8. Brake lever 6 and application shaft 8 are disposed inside the caliper 1.

Figure 2:
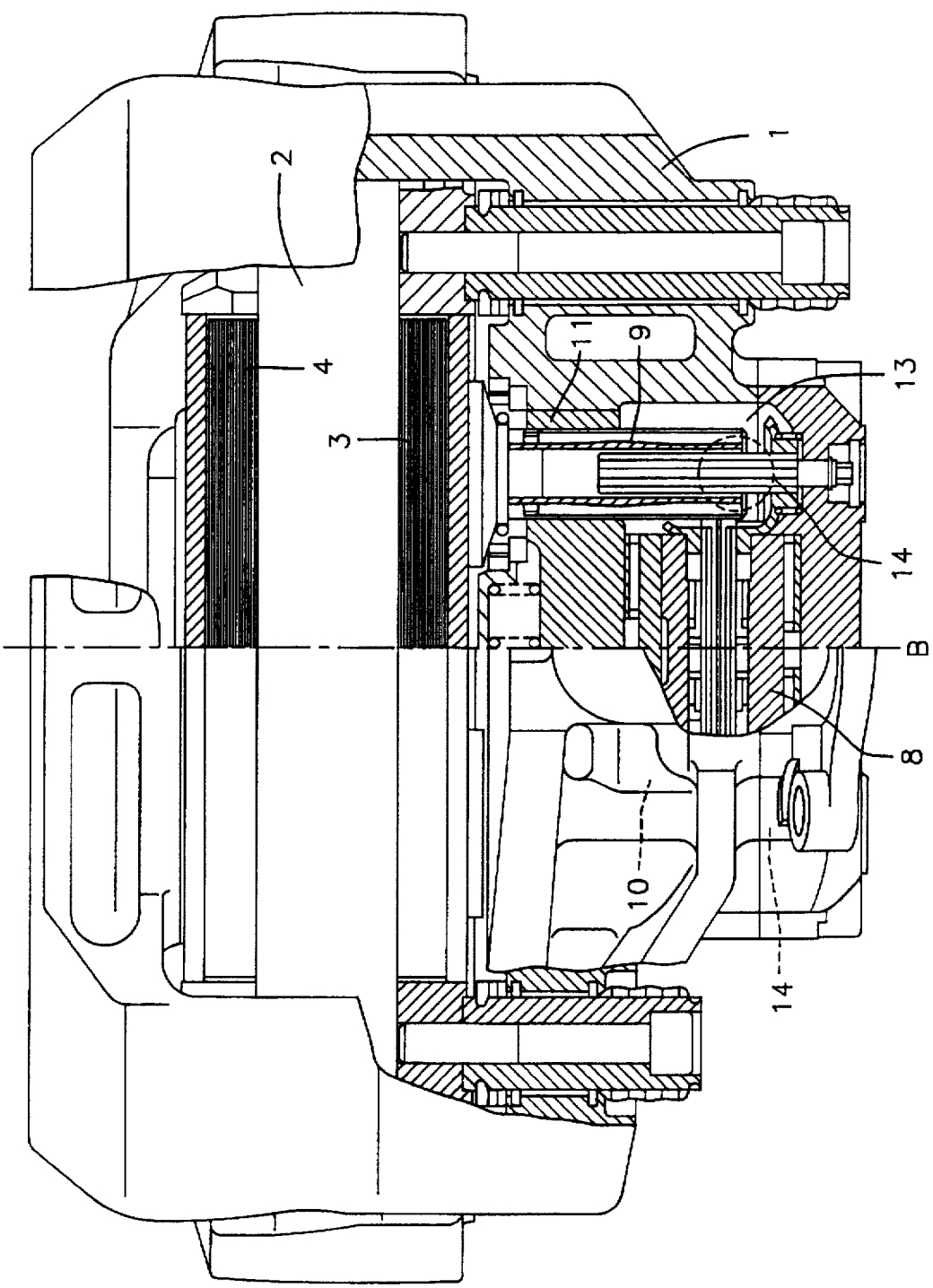
FIG. 2 is a view partially in cross section of the disc brake according to FIG. 1, in a plane perpendicular to FIG. 1.

The application shaft 8 extends along swing axis A and has a cam-like contour, such that when rotated around its longitudinal axis a relative translational movement of the caliper 1 and brake head 3 results, in the axial direction of the brake rotor 2. In this manner, force is transmitted from the application shaft 8 to the brake head 3, via thrust shafts 9, 10 (FIG. 2) disposed upstream of the brake head in the flow of force from lever 6 to brake head 3.

The embodiment illustrated has two thrust shafts 9, 10 which are accommodated in a thrust piece 11. Again, it is noted that the invention is not limited to this embodiment. Thus, in an alternative embodiment, a single thrust shaft may be disposed centrally in the thrust piece; or alternatively the thrust piece(s) may be eliminated, and adjustable thrust shafts may be accommodated (e.g. in threaded bores) in the caliper itself.

In the direction toward the brake rotor with respect to the application mechanism 5, at least one compression spring 12 (FIG. 1) is provided which is braced against the caliper 1, to pre-stress the application mechanism 5 and swinging lever 6, urging them toward an idle position.

Figure 3:
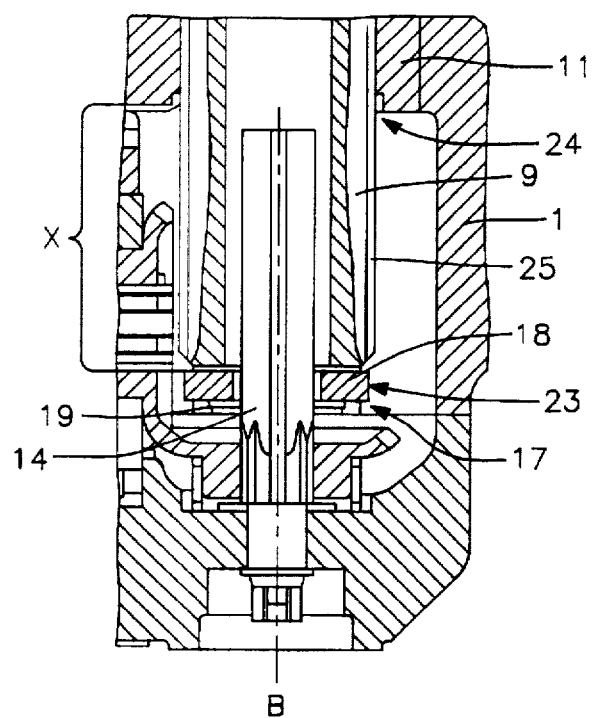
FIG. 3 is an enlarged view of a part of FIG. 2 showing a brake adjusting mechanism.

An adjusting mechanism 13 (shown enlarged in FIG. 3) is provided, to compensate for wear on the brake pads. Mechanism 13 is connected between the application shaft 8 and the thrust shafts 9, 10, being coupled to the application shaft 8, on one side, and to the thrust shafts on the other. Mechanism 13 is designed to transmit rotational movement of the application shaft 8 to the thrust shafts in the form of an un-screwing of the thrust shafts out of the thrust piece 11 in the direction toward rotor 2. Adjusting mechanism 13 comprises a force-dependent one-way coupling, which tends to prevent over-adjustment.

Although the drawings show two thrust shafts 9, 10, for simplification in the following discussion only the interaction of the adjusting mechanism with thrust shaft 9 will be described.

The adjusting mechanism 13 has an elongate drive element 14 which extends into the thrust shaft 9. Element 14 has a profiled outer contour and a longitudinal axis which coincides with the longitudinal axis B of thrust shaft 9.

Figure 7:
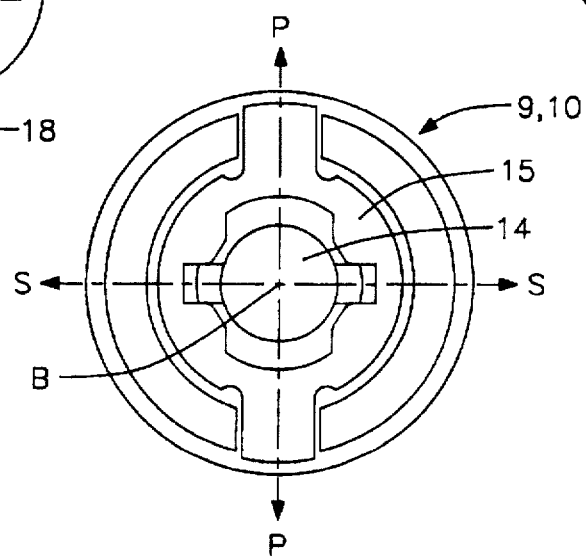
FIG. 7 is an end view of the elements of FIGS. 4 to 6, showing their assembly and interaction.

A profile plate 15 is disposed in the ring-shaped space between drive element 14 and thrust shaft 9, which plate 15 has an inner profile which corresponds to the outer profile of the drive element 14, for the purpose of rotationally coupling profile plate 15 to the drive element 14. The profiles of drive element 14 and profile plate 15 are designed such that the two elements are mutually slidable to a certain extent in a direction S (FIG. 7) perpendicular to the longitudinal axis B. For this purpose, recesses 21 in an opening 20 in a profile plate 15 accommodate and engage projections 22 on drive element 14. The radial extent of the projections 22 is less than that of the recesses 21.

Profile plate 15 is coupled to thrust shaft 9 by generally similar means, namely projections 18 on plate 15 which engage slots 17 in shaft 9.

It is evident that the outer radius of the drive element 14 (excluding the projections 22) is less than the inner radius of profile plate 15, and that the outer radius of profile plate 15 (excluding the projections 18) is less than the inner radius of the thrust shaft 9. The outer periphery of the projections 18 of plate 15 is designated 23.

Profile plate 15 is slidable with respect to thrust shaft 9 in a direction P (FIG. 7) which is perpendicular to sliding direction S, in the exemplary embodiment shown.

Figure 4:
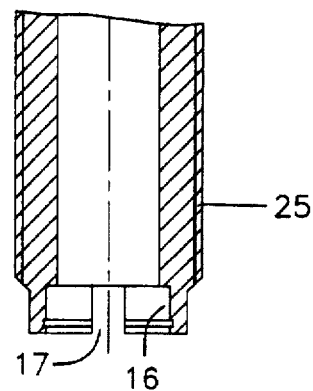
FIG. 4 is a cross sectional view through a thrust shaft.
Figure 4A:
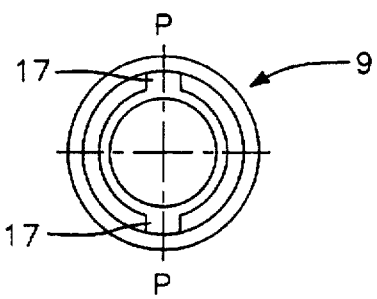
FIG. 4a is an end view of the thrust shaft.
Figure 5:
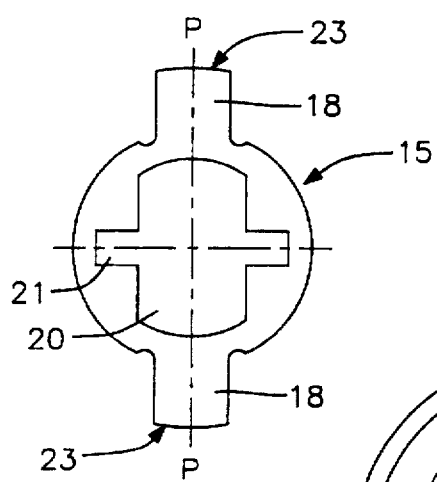
FIG. 5 is a plan view of a profile plate.
Figure 6:
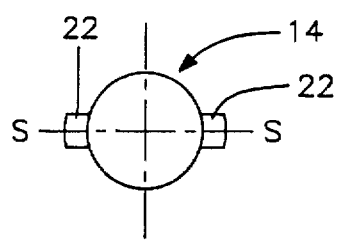
FIG. 6 is an end view of a drive element.

Profile plate 15 is held in thrust shaft 9 in a holding region 16 (FIG. 4) with minimal axial play, by means of a retaining nut 19. The length of the projections 18 on profile plate 15 is chosen such that when the thrust shaft 9 is screwed out of the thrust piece 11 and toward the rotor 2 by a distance X (FIG. 3) the projections 18 come to abut against a detent region 24 of thrust piece 11. For this purpose, the external periphery 23 of projections 18 extends radially beyond the outer surface of a thread 25 on the thrust shaft 9. This protects against excessive screwing out of thrust shaft 9.

Thus, according to the invention, the drive element 14 and the thrust shaft 9 are coupled with regard to rotation around their common axis B, and are mutually slidable in the direction of said axis B and in directions S and P which are perpendicular to said axis B. This provides a rotational coupling which does not transmit vibrations and oscillations. Fluctuations due to manufacturing tolerances and assembly variations are thereby compensated for, and assembly itself is facilitated.

The adjustment mechanism operates in known manner by intermeshing bevel gears on one end of the application shaft 8 and the bottom of drive element 4.

What is claimed:

1. A disc brake comprising a brake caliper with two arms to extend over a brake rotor and engage brake heads to be applied against opposite sides of the rotor, a brake application mechanism having an application shaft oriented substantially parallel to a rotor midplane, said shaft being braced against the caliper on one side of said shaft remote from the rotor and being connected to one of the brake heads on an opposite side of said shaft adjacent the rotor, said application shaft having a cam contour for providing relative movement of the caliper and said one of the brake heads when said shaft is rotated by a brake lever which extends radially from the application shaft; and an adjusting mechanism connected between the application shaft and said one of the brake heads comprising a rotary drive element connected to the application shaft, a thrust shaft connected to said one of the brake heads to provide a change in distance between the brake head and the brake rotor responsive to rotation of the thrust shaft, and a coupling between said drive element and the thrust shaft for providing a rotationally fixed connection between the drive element and the thrust shaft whereby the thrust shaft is rotated by rotation of the drive element, said coupling further providing an axially slidably connection between the drive element and the thrust shaft, and said coupling still further including formations for providing relative translational movement between the drive element and the thrust shaft in each of two directions perpendicular to a longitudinal axis of the thrust shaft.

2. A disc brake according to claim 1; wherein said drive element comprises an elongate drive element telescopically interfitting with said thrust shaft and wherein said coupling includes a profile plate provided in a space between the drive element and the thrust shaft, the profile plate being coupled to the drive element and to the thrust shaft in a mutually non-rotational manner, wherein said formations comprise first formations on the profile plate and on the thrust shaft providing translational movement between the profile plate and the thrust shaft in a first direction of movement perpendicular to the longitudinal axis of the thrust shaft and second formations on the profile plate and on the drive element providing translational movement between the profile plate and the drive element in a second direction of movement which is also perpendicular to the longitudinal axis of he thrust shaft.

3. A disc brake according to claim 2, wherein said second formations comprise a projection on the drive element, which engages a recess in the profile plate; and wherein said first formations comprise a projection on the profile plate, which engages a slot in the thrust shaft.

4. A disc brake according to claim 2, wherein the profile plate is mounted on the thrust shaft in an axially fixed manner at a region of the thrust shaft remote from the brake rotor.

5. A disc brake according to claim 2, wherein the thrust shaft has an outside thread and the profile plate extends radially beyond said thread.

6. A disc brake according to claim 5, wherein the thrust shaft is screwed into a thrust piece by said outside thread, the thrust piece having a detent region for engaging the profile plate if the thrust shaft is screwed into said thrust piece beyond a certain limiting extent.

7. A disc brake according to claim 1 wherein said two directions are mutually perpendicular.

* * * * *